(12) United States Patent
Martini et al.

(10) Patent No.: US 8,851,055 B2
(45) Date of Patent: Oct. 7, 2014

(54) METHOD AND APPARATUS FOR CONTROLLING HYBRID POWERTRAIN SYSTEM IN RESPONSE TO ENGINE TEMPERATURE

(75) Inventors: Ryan D. Martini, Wolverine Lake, MI (US); Brian L. Spohn, Holly, MI (US); Allen J. Lehmen, Howell, MI (US); Teresa L. Cerbolles, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 560 days.

(21) Appl. No.: 13/162,720

(22) Filed: Jun. 17, 2011

(65) Prior Publication Data

US 2012/0323461 A1 Dec. 20, 2012

(51) Int. Cl.
| | | |
|---|---|---|
| *F02D 41/00* | (2006.01) |
| *B60H 1/00* | (2006.01) |
| *B60K 6/46* | (2007.10) |
| *B60K 6/20* | (2007.10) |
| *B60W 20/00* | (2006.01) |
| *B60W 10/06* | (2006.01) |

(52) U.S. Cl.
CPC .............. *B60H 1/00314* (2013.01); *B60K 6/46* (2013.01); *F02D 2200/023* (2013.01); *B60K 6/20* (2013.01); *B60W 20/108* (2013.01); *Y02T 10/6217* (2013.01); *B60H 1/004* (2013.01); *B60W 2710/0688* (2013.01); *B60W 10/06* (2013.01)
USPC .......... 123/686; 123/41.12; 701/22; 701/113; 180/65.21; 180/65.25

(58) Field of Classification Search
CPC ...... B60H 1/00314; B60H 1/004; B60K 6/20; B60K 6/46; B60W 10/06; B60W 20/108; B60W 2710/0688; F02D 2200/023; Y02T 10/6217
USPC .......... 701/102, 112, 113; 180/65.28, 65.285, 180/65.265; 123/41.05, 179.3, 179.4, 678, 123/41.12, 179.15, 435, 406.55, 686; 290/40 A, 40 B, 40 C
See application file for complete search history.

(56) References Cited

U.S. PATENT DOCUMENTS

| | | | | |
|---|---|---|---|---|
| 4,175,521 A | * | 11/1979 | Hattori et al. ................. | 123/686 |
| 4,193,380 A | * | 3/1980 | Marchak et al. .............. | 123/491 |
| 6,335,573 B1 | * | 1/2002 | Eguchi et al. ............... | 290/40 C |
| 8,052,066 B2 | * | 11/2011 | Watanabe et al. ........ | 237/12.3 B |
| 8,342,142 B2 | * | 1/2013 | Shintani et al. ............. | 123/41.12 |
| 2004/0069546 A1 | * | 4/2004 | Lou et al. ..................... | 180/65.2 |
| 2009/0118090 A1 | | 5/2009 | Heap | |
| 2011/0288701 A1 | * | 11/2011 | Chen ............................... | 701/22 |
| 2012/0222647 A1 | * | 9/2012 | Futonagane et al. .... | 123/196 AB |

OTHER PUBLICATIONS

U.S. Appl. No. 13/029,381, Michael Arnett, not pub'd.
U.S. Appl. No. 13/160,937, Jy-Jen F. Sah, not pub'd.
U.S. Appl. No. 13/160,908, Sean W. McGrogan, not pub'd.
U.S. Appl. No. 13/161,584, Sean W. McGrogan, not pub'd.
U.S. Appl. No. 13/161,602, Jy-Jen F. Sah, not pub'd.

(Continued)

*Primary Examiner* — Erick Solis
*Assistant Examiner* — Carl Staubach

(57) ABSTRACT

A method for controlling a hybrid powertrain system including an internal combustion engine includes controlling operation of the hybrid powertrain system in response to a preferred minimum coolant temperature trajectory for the internal combustion engine.

14 Claims, 7 Drawing Sheets

(56) References Cited

OTHER PUBLICATIONS

U.S. Appl. No. 13/152,380, Michael Arnett, not pub'd.
U.S. Appl. No. 13/162,720, Ryan D. Martini, not pub'd.
U.S. Appl. No. 13/163,668, Anthony H. Heap, not pub'd.
U.S. Appl. No. 13/163,115, Jy-Jen F. Sah, not pub'd.
U.S. Appl. No. 13/162,767, Sean McGrogan, not pub'd.

* cited by examiner

METHOD AND APPARATUS FOR CONTROLLING HYBRID POWERTRAIN SYSTEM IN RESPONSE TO ENGINE TEMPERATURE

GOVERNMENT CONTRACT RIGHTS

This invention was made with U.S. Government support under Agreement No. DE-FC26-08NT04386 awarded by the U.S. Department of Energy. The U.S. Government may have certain rights in this invention.

TECHNICAL FIELD

This disclosure is related to control of hybrid powertrain systems including torque machines and internal combustion engines.

BACKGROUND

The statements in this section merely provide background information related to the present disclosure. Accordingly, such statements are not intended to constitute an admission of prior art.

Vehicle systems include powertrain systems that provide tractive torque for propulsion. Powertrain systems may include hybrid systems, all-electric systems, and extended-range electric systems that may be configured to operate in various operating modes to generate and transfer torque to a driveline. Such powertrain systems use torque-generative devices, clutches and transmissions. Torque-generative devices include internal combustion engines and electrically-powered motor/generators, i.e., electric machines.

Known powertrain systems employ control schemes to minimize fuel consumption in an internal combustion engine while responding to operator torque requests for tractive power. Known control schemes that minimize fuel consumption include deceleration fuel cutoff (DFCO) schemes and engine autostop schemes. Consumed fuel generates power and heat, which may be used elsewhere in the powertrain system and vehicle, such as in a vehicle cabin compartment. Known vehicle systems include operator-controllable HVAC systems that generate thermal demands and electrical demands that may be stochastic in nature and vary from nominal expected warm-up behavior.

Under certain powertrain operating conditions, a powertrain system operating only to minimize fuel consumption may not operate an internal combustion engine in a manner that generates heat to meet thermal demands and requirements, for example for cabin comfort and window defrosting/defogging.

SUMMARY

A method for controlling a hybrid powertrain system including an internal combustion engine includes controlling operation of the hybrid powertrain system in response to a preferred minimum coolant temperature trajectory for the internal combustion engine.

BRIEF DESCRIPTION OF THE DRAWINGS

One or more embodiments will now be described, by way of example, with reference to the accompanying drawings, in which.

DETAILED DESCRIPTION

Figure 1:
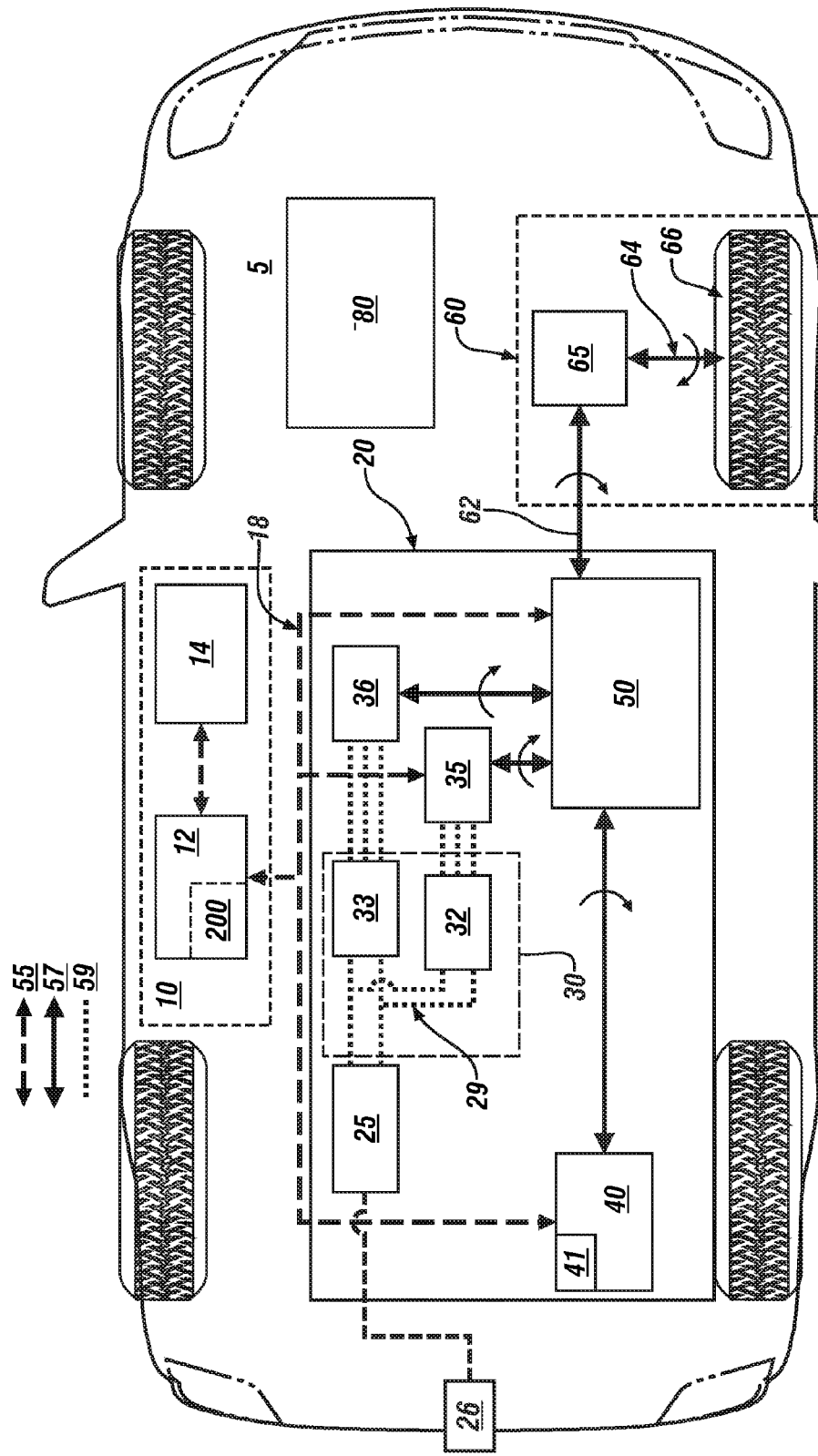
FIG. 1 illustrates a vehicle including a hybrid powertrain system coupled to a driveline and controlled by a control system in accordance with the disclosure.

Referring now to the drawings, wherein the showings are for the purpose of illustrating certain exemplary embodiments only and not for the purpose of limiting the same, FIG. 1 schematically shows vehicle 5 including a hybrid powertrain system 20 including an internal combustion engine 40 and non-combustion torque machines 35 and 36 that are coupled to a transmission 50 that is coupled to a driveline 60, all of which may be controlled by a control system 10. Like numerals refer to like elements throughout the description. The hybrid powertrain system 20 may be configured as a hybrid system (including one of a series-hybrid system, a parallel-hybrid system, and a compound-hybrid system), an extended-range electric system (EREV), or another powertrain configuration without limitation. The vehicle 5 includes an interior compartment 80, which primarily includes a cabin compartment for seating. The vehicle 5 including the hybrid powertrain system 20 is illustrative but not limiting.

The hybrid powertrain system 20 employs communications paths 55, mechanical power paths 57, and high-voltage electric power paths 59. The mechanical power paths 57 mechanically couple elements that generate, use, and/or transfer torque, including the internal combustion engine 40, first and second electrically-powered torque machines 35 and 36, respectively, transmission 50, and driveline 60. The high-voltage electric power paths 59 electrically connect elements that generate, use, and/or transfer high-voltage electric power, including such elements as an energy storage device 25, an inverter module 30, and the first and second electrically-powered torque machines 35 and 36. The high-voltage electric power paths 59 include a high-voltage DC bus 29. The communications path 55 may include direct data transfer lines and high-speed data transfer lines to effect communications within the control system 10 and effect communications between the control system 10 and elements of the vehicle 5. The communications path 55 may include one or more of a direct analog connection, a digital connection, a serial peripheral interface (SPI) bus, and a high-speed communications bus 18 that may include a controller area network, i.e., a CAN bus.

The engine 40 is any internal combustion engine that converts fuel to mechanical power through a combustion process. The engine 40 is equipped with a plurality of sensing devices and actuators configured to monitor operation and deliver fuel to form a combustion charge to generate torque. One sensor of interest is a coolant temperature sensor 41 configured to monitor an operating temperature of the engine 40. The engine 40 is configured to operate as a spark-ignition engine with timing of combustion and the associated engine torque being controlled by advancing or retarding spark ignition timing. The engine 40 is configured as a spark-ignition direct-injection (SIDI) engine that operates in either a spark-ignition combustion mode or a controlled auto-ignition (HCCI) combustion mode. Alternatively, the engine 40 is configured to operate as a compression-ignition engine with timing of combustion and the associated engine torque controlled by advancing or retarding timing of fuel injection events. The engine 40 is configured to execute autostart and autostop control schemes and deceleration fuel cutoff (DFCO) control schemes during ongoing operation of the vehicle system 5. By way of definition, the engine 40 is considered to be in an ON state when it is being fueled and is rotating, and is considered to be in an OFF state when it is not being fueled and is not rotating. The engine 40 is considered to be in the DFCO state when it is rotating but is not being fueled.

The first and second torque machines 35 and 36 are any non-combustion torque machines, and preferably include multi-phase electric motor/generators electrically connected to the inverter module 30 that are configured to convert stored electric energy to mechanical power and convert mechanical power to electric energy that may be stored in the energy storage device 25. The first and second torque machines 35 and 36 have limitations in power outputs in the form of torque and rotational speeds.

The inverter module 30 includes first and second inverters 32 and 33 that electrically connect to the first and second torque machines 35 and 36, respectively. The first and second torque machines 35 and 36 interact with the respective first and second inverters 32 and 33 to convert stored electric energy to mechanical power and convert mechanical power to electric energy that may be stored in the energy storage device 25. The first and second electric power inverters 32 and 33 are operative to transform high voltage DC electric power to high-voltage AC electric power and also operative to transform high voltage AC electric power to high-voltage DC electric power. Electric power originating in the first torque machine 35 may be transferred electrically to the energy storage device 25 via the inverter module 30 and the high-voltage bus 29 and to the second torque machine 36 via the inverter module 30.

The transmission 50 preferably includes one or more differential gear sets and activatable clutch components to effect torque transfer between the engine 40, the first and second torque machines 35 and 36, and an output member 62 that couples to the driveline 60. The transmission 50 is a two-mode transmission device configured to operate in conjunction with the first and second torque machines 35 and 36 to transfer torque in one of two or more distinct gear trains referred to as Mode 1 and Mode 2. The two or more distinct gear trains referred to as Mode 1 and Mode 2 may include either or both fixed gear operation and continuously variable operation.

The driveline 60 may include a differential gear device 65 that mechanically couples to an axle 64 or half-shaft that mechanically couples to a wheel 66. The differential gear device 65 is coupled to the output member 62 of the hybrid powertrain system 20, and transfers output power therebetween. The driveline 60 transfers tractive power between the transmission 50 and a road surface.

The energy storage device 25 may be any energy storage device, e.g., a high-voltage battery. One exemplary energy storage device 25 is a high-voltage battery fabricated from a plurality of lithium-ion cells. It is appreciated that the energy storage device 25 may include a plurality of electrical cells, ultracapacitors, and other electrochemical devices configured to store energy and provide electric energy on-vehicle. When the energy storage device 25 is a high-voltage battery, it is electrically connected via the high-voltage bus 29 to the inverter module 30 that connects to the first and second torque machines 35 and 36 to transfer electric power therebetween. An external connector 26 electrically connects to the high-voltage battery 25 and is connectable to an external AC power source to provide electric power for charging the high-voltage battery 25.

The control system 10 includes a control module 12 that signally connects to an operator interface 14. The operator interface 14 is used to collectively indicate a plurality of human/machine interface devices through which the vehicle operator commands operation of the vehicle 5. It is appreciated that human/machine interface devices may include, e.g., an ignition switch to enable an operator to crank and start the engine 40, an accelerator pedal, a brake pedal, and a transmission range selector, i.e., PRNDL. Vehicle operator commands include an operator torque request (To), which indicates an operator request for a magnitude of tractive torque delivered to the driveline 60 to effect vehicle acceleration. It is appreciated that vehicle acceleration includes positive and negative acceleration events.

The vehicle includes other systems and control schemes that may affect engine operation, engine coolant temperature and electric load. The vehicle system has a controllable HVAC system that places thermal and electrical load demands in response to operator inputs. Other vehicle systems may include an exhaust gas heat recovery (EGHR) system. One exemplary EGHR includes a first heat exchanger that transfers heat between exhaust gas and engine coolant, and a second heat exchanger that transfers heat between engine coolant and transmission fluid with a fluidic circuit that fluidly connects the first and second heat exchangers. Other vehicle systems may include a controllable electric-powered cabin heater. Other vehicle systems may include a controllable electric-powered windshield defogger. Other vehicle systems may include a controllable electric-powered rear window defogger.

The control module 12 signally connects to sensing devices of each of the energy storage device 25, the inverter module 30, the first and second torque machines 35 and 36, the engine 40, and the transmission 50. The control module 12 operatively connects to actuators of the inverter module 30 including the first and second inverters 32 and 33, the engine 40, and the transmission 50 either directly or via the communications bus 18 to control operation thereof in accordance with executed control schemes that are stored in the form of routines and calibrations.

The control module 12 is illustrated as a single, unitary element for ease of depiction. The control module 12 preferably has a distributed architecture including a plurality of control module devices. The functions described as being performed by the control module 12 may be combined into one or more devices, e.g., implemented in software, hardware, and/or application-specific integrated circuitry (ASIC) and ancillary circuits that are separate and distinct from the control module 12. Preferably, a master control module device oversees and directs operations of individual control modules of the distributed architecture that are associated with the individual control module devices. The individual control modules may be assigned to and may be physically located near one of the energy storage device 25, the inverter module 30, the first and second torque machines 35 and 36, the engine 40, and the transmission 50 to monitor and control operation thereof. As such, individual control module devices of the control module 12 may directly signally connect to individual sensing devices and directly operatively connect to individual actuators, including the energy storage device 25, the inverter module 30, the first and second torque machines 35 and 36, the engine 40, and the transmission 50 to monitor and control operation thereof.

Communications between the master control module device and individual control module devices of the control module 12, and between the individual control module devices and individual ones of the energy storage device 25, the inverter module 30, the first and second torque machines 35 and 36, the engine 40, and the transmission 50 are accomplished using the communications paths 55 including the communications bus 18. Communicated messages may be in the form of sensor signals and actuator commands using communications protocols associated with the specific elements of the communications path 55, e.g., serial communications. The communications protocols for the high-speed communications bus 18 preferably include executing communications in a structured manner by periodically sending messages, e.g., on a 12.5 ms loop cycle.

It is appreciated that a control system has latencies between a sensed event and a corresponding response. The latencies may be related to and include sensor response times, sensor signal A/D conversion (where necessary), communications protocols for messages including sensor signals, controller analysis including actuator response determination, communication protocols for messages including actuator responses, and protocols associated with executing an actuator command. Latencies include those introduced due to the distributed architecture of the control module 12. It is appreciated that any total latency between a sensed event and a corresponding response may be predictable because the aforementioned latencies are measurable and predictable. One latency of interest herein is a latency between a commanded torque output from one of the first and second electrically-powered torque machines 35 and 36 and a corresponding change in the electric power flow from the high-voltage energy storage device 25.

Monitored parameters of the engine 40 preferably include engine speed (Ne), engine torque or load (Te), and temperature. Monitored parameters of the transmission 50 preferably include rotational speeds such as output speed (No), tractive torque (To), and hydraulic pressure at a plurality of locations, from which parameters including application of specific torque transfer clutches may be determined. Monitored parameters of the first and second torque machines 35 and 36 preferably include rotational speeds and power flows, e.g., electric current flow, from which motor torque commands (Tm) may be determined. Monitored parameters of the energy storage device 25 may include battery current and voltage (power), state of charge, and battery temperature. It is appreciated that the monitored parameters may be measured directly, inferred from direct measurements, or otherwise estimated.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation.

Figure 2:
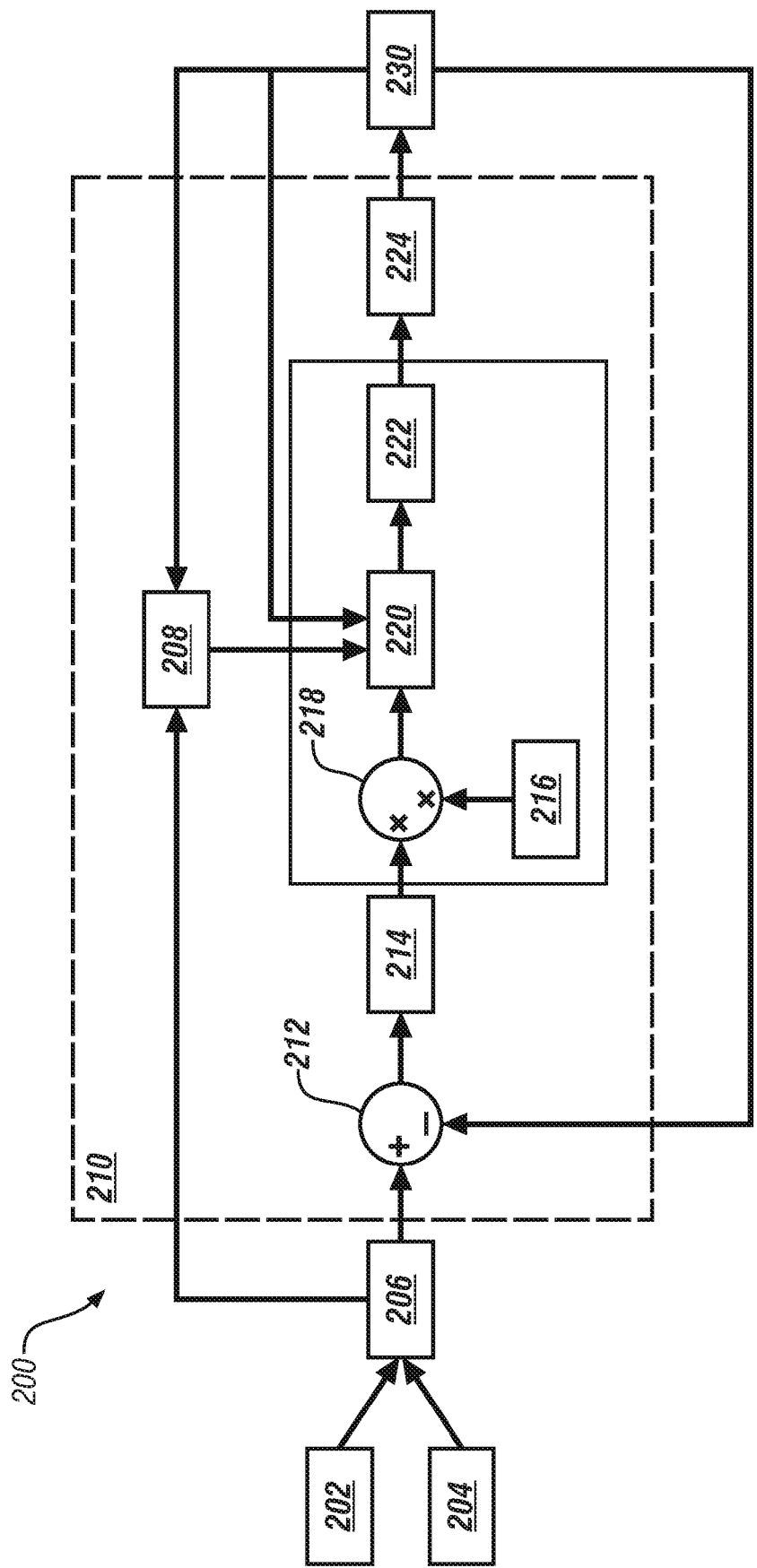
FIG. 2 illustrates a control scheme for controlling and managing operation of a hybrid powertrain system in response to coolant temperature and a preferred coolant temperature trajectory in accordance with the disclosure.

FIG. 2 illustrates control scheme 200 for controlling and managing operation of a hybrid powertrain system in response to coolant temperature and a preferred coolant temperature trajectory. The control scheme 200 is described with reference to the vehicle 5 employing a hybrid powertrain system 20 of FIG. 2, but it is appreciated that the control scheme 200 may be executed on other hybrid powertrain systems without limitation. The control scheme 200 includes controlling operation of the hybrid powertrain system 20 in response to a preferred minimum coolant temperature trajectory for the internal combustion engine.

Table 1 is provided as a key to FIG. 2 wherein the numerically labeled blocks and the corresponding functions are set forth as follows.

TABLE 1

| BLOCK | BLOCK CONTENTS |
| --- | --- |
| 202 | Monitor outside air temperature |
| | Monitor vehicle runtime |
| | Monitor vehicle soak time |
| | Monitor operator torque request |
| 204 | Determine requirements for warm-up and stabilized operation |
| 206 | Determine preferred minimum coolant temperature trajectory |
| 208 | Create hysteresis temperature band around preferred minimum coolant temperature trajectory |
| 210 | Execute closed-loop control of hybrid powertrain system in response to preferred minimum coolant temperature trajectory |
| 212 | Determine difference between the preferred minimum coolant temperature and coolant temperature |
| 214 | Select scalar multiplier |
| 216 | Determine base engine heat rejection response surface for the engine |
| 218 | Adjust the base engine heat rejection response surface for the engine with the scalar multiplier |

TABLE 1-continued

| BLOCK | BLOCK CONTENTS |
|---|---|
| 220 | Generate modified heat rejection response surface for the engine |
| 222 | Determine Tm, Te commands in response to operator torque request as function of adjusted base engine power loss and hysteresis temperature band |
| 224 | Control other operations of hybrid powertrain system and vehicle systems |
| 230 | Monitor coolant temperature |

Monitored conditions of interest to the control scheme 200 include outside air temperature, vehicle runtime, vehicle soak time, and an operator torque request (202). The outside air temperature, vehicle runtime, and vehicle soak time are used as indicators of temperature of the vehicle interior compartment 80 of a subject vehicle.

Figure 3:
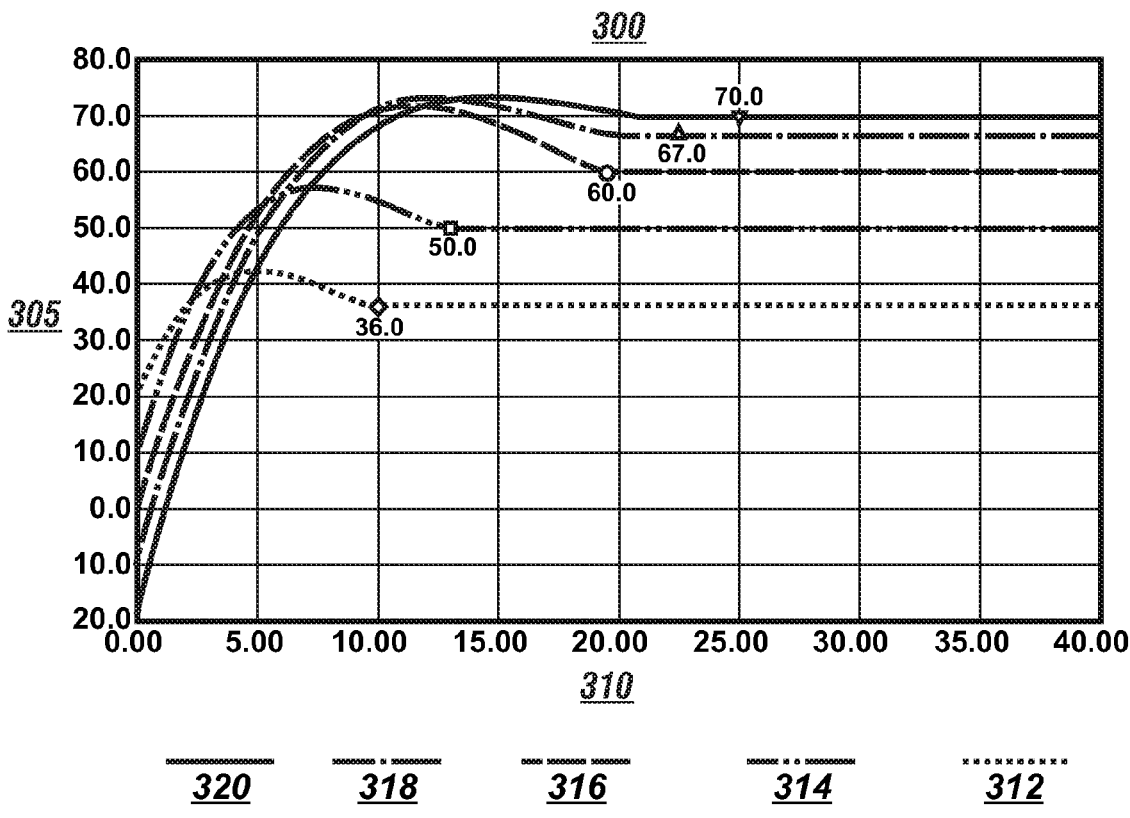
FIG. 3 illustrates temperature (° C.) in relation to vehicle runtime (min) for a vehicle employing a hybrid powertrain system in accordance with the disclosure.

Requirements for warm-up and stabilized operation are determined (204) and preferably include a preferred minimum coolant temperature trajectory that includes minimum coolant temperatures in relation to elapsed time of operation that are associated with an initial warm-up period and a stabilized period for a subject vehicle. The periods of operation are defined with reference to vehicle runtime. An exemplary set of requirements including preferred minimum coolant temperature trajectories for warm-up and stabilized operation are shown with reference to FIG. 3. FIG. 3 illustrates a datagraph 300 showing temperature (° C.) 305 in relation to vehicle runtime 310, which is an elapsed running time (min) for the vehicle 5 employing a hybrid powertrain system 20. It is appreciated that engine runtime corresponds to vehicle runtime during the initial warm-up period of operation. The datagraph 300 depicts preferred minimum coolant temperature trajectories in relation to vehicle runtime for a plurality of outside air temperatures, and includes warm-up and stabilized operation for an exemplary vehicle. The preferred minimum coolant temperature trajectories are shown in relation to vehicle runtime for a plurality of outside air temperatures including 20° C. (312), 10° C. (314), 0° C. (316), −10° C. (318) and −20° C. (320). The depicted preferred minimum coolant temperature trajectories are shown for a vehicle soak time that is of sufficient duration to permit the subject vehicle to achieve stabilized temperatures, including a stabilized coolant temperature and a stabilized temperature of a vehicle interior compartment. The depicted data is illustrative but not limiting. There are preferably adjustments to the preferred minimum coolant temperature trajectories to accommodate variations in coolant temperature and temperature of a vehicle interior compartment for vehicle soak time(s) of lesser duration(s) for each of the plurality of outside air temperatures including 20° C. (312), 10° C. (314), 0° C. (316), −10° C. (318) and −20° C. (320). It is appreciated that the preferred minimum coolant temperature trajectories are specific to a vehicle interior compartment of a subject vehicle.

The outside air temperature, vehicle runtime, and vehicle soak time are used to select a preferred minimum coolant temperature trajectory, which is defined in relation to vehicle runtime and outside air temperature, e.g., outside air temperatures of 20° C., 10° C., 0° C., −10° C. and −20° C., preferably taking into account the vehicle soak time, and preferably employing the aforementioned minimum coolant temperature trajectories shown with reference to FIG. 3 (206). Preferably, interpolation schemes are implemented to determine a preferred minimum coolant temperature trajectory for outside air temperatures that lie between the outside air temperatures of 20° C., 10° C., 0° C., −10° C. and −20° C.

A hysteresis temperature band is created around the preferred minimum coolant temperature trajectory (208). The hysteresis temperature band is employed to operate the hybrid powertrain system 20 in response to an operator torque request (222). The hybrid control scheme employs the hysteresis temperature band to control occurrence of engine autostop events, engine autostart events and DFCO events.

A closed-loop control of the hybrid powertrain system is executed in response to the preferred minimum coolant temperature trajectory (210). The closed-loop control includes directly monitoring the coolant temperature (230), preferably using a coolant temperature sensor. A difference between the coolant temperature and a preferred minimum coolant temperature corresponding to vehicle runtime is determined by employing the preferred minimum coolant temperature trajectory (212).

Figure 6:
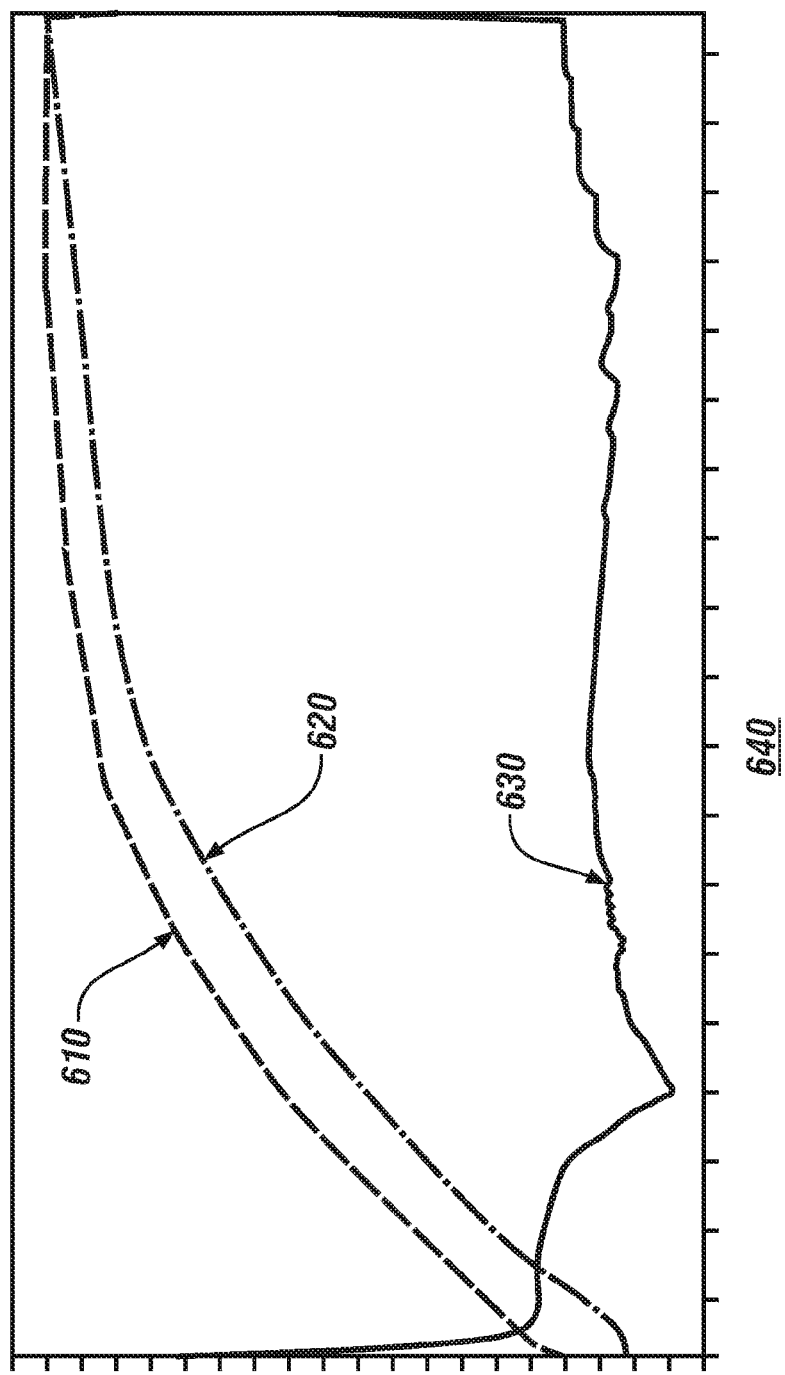
FIG. 6 illustrates an exemplary heater performance scalar in relation to a preferred minimum coolant temperature and a coolant temperature as a function of vehicle runtime for an internal combustion engine employed in a hybrid powertrain system in accordance with the disclosure.

A heater performance scalar is determined that corresponds to the difference between the preferred minimum coolant temperature and the coolant temperature for the present vehicle runtime (214). The magnitude of the heater performance scalar corresponding to the difference between the preferred minimum coolant temperature and the coolant temperature may be determined using a non-linear proportional control scheme, a proportional-integral control scheme, or another control scheme. FIG. 6 illustrates an exemplary heater performance scalar 630 in relation to a preferred minimum coolant temperature 610 and a coolant temperature 620 as a function of the present vehicle runtime 640 for an internal combustion engine 40 employed in a hybrid powertrain system 20. The magnitude of the heater performance scalar ramps in from an initially high value and changes as a function of the difference between the preferred minimum coolant temperature 610 and the coolant temperature for the present vehicle runtime 620.

Figure 4:
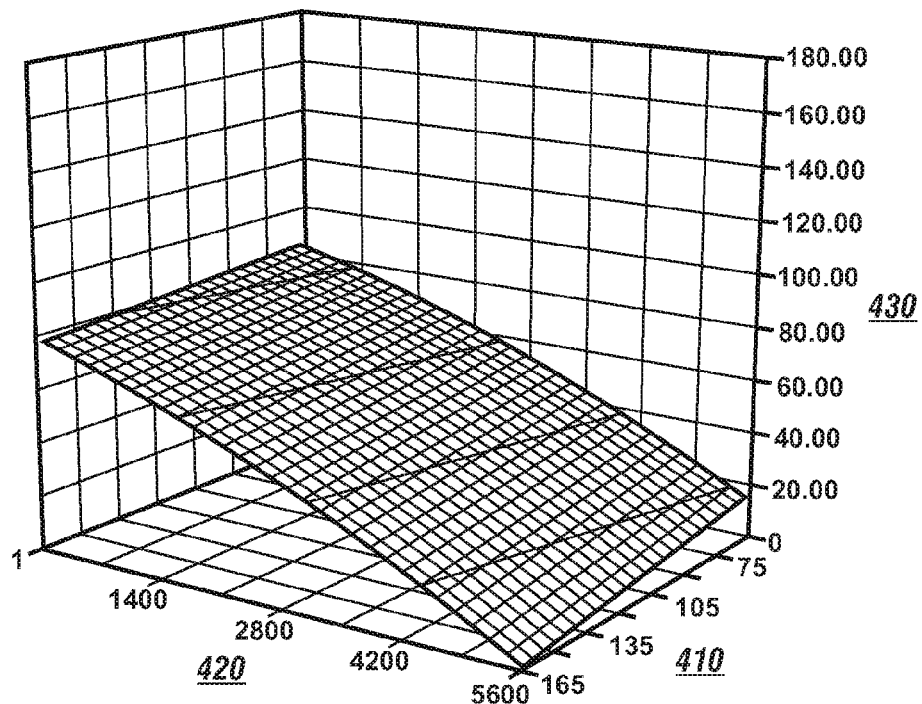
FIG. 4 illustrates a base engine heat rejection response surface, which includes base heat rejection operating costs (kW) determined in relation to engine operating points defined in terms of engine speed (RPM) and engine torque (Nm) for an internal combustion engine employed in a hybrid powertrain system in accordance with the disclosure.

A base engine heat rejection response surface is developed for the engine of the hybrid powertrain system (216). An exemplary base engine heat rejection response surface is shown with reference to FIG. 4, which characterizes engine heat rejection in terms of a power loss as a function of engine speed/load operating points. FIG. 4 illustrates a base engine heat rejection response surface, which includes a plurality of base heat rejection operating costs (kW) 430 determined in relation to engine operating points defined in terms of engine speed (RPM) 420 and engine torque (Nm) 410 for an internal combustion engine 40 employed in the hybrid powertrain system 20. A lowest heat rejection cost of nominally 0 kW occurs at a speed/load operating point having the greatest magnitude of heat rejection. The heat rejection may be in terms of raw heat rejection or heat rejection combined with engine power per fuel rate.

Figure 5:
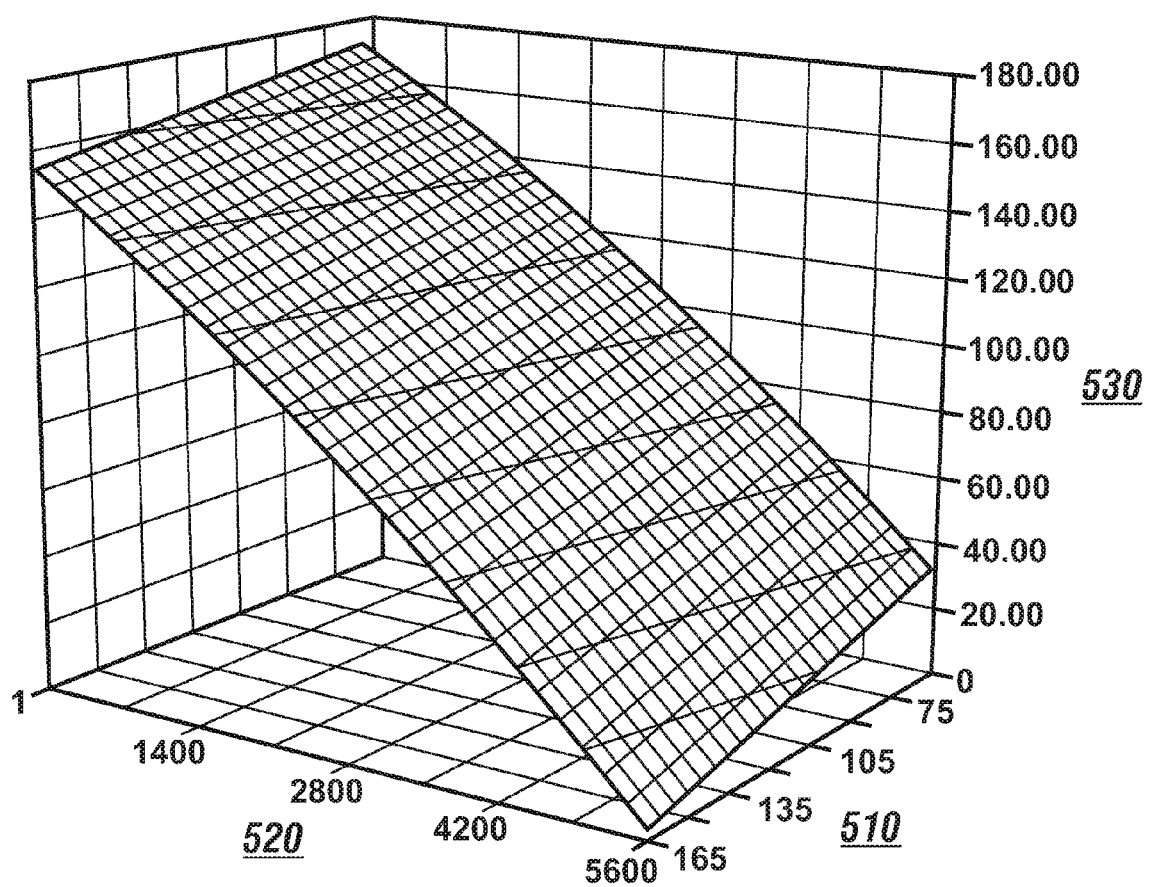
FIG. 5 illustrates a modified engine heat rejection response surface, which includes modified heat rejection operating costs (kW) determined in relation to engine operating points defined in terms of engine speed (RPM) and engine torque (Nm) for an internal combustion engine employed in a hybrid powertrain system in accordance with the disclosure.

The base engine heat rejection response surface developed for the internal combustion engine is multiplied by the heater performance scalar (218) to generate a modified heat rejection response surface (220), which is shown with reference to FIG. 5. FIG. 5 illustrates a modified engine heat rejection response surface 500, which includes operating costs (kW) 530 determined by multiplying the base heat rejection operating costs (kW) 430 and the heater performance scalar, in relation to engine operating points defined in terms of engine speed (RPM) 520 and engine torque (Nm) 510 for the internal combustion engine 20. The lowest heat rejection cost of nominally 0 kW occurs at the speed/load operating point having the greatest magnitude of heat rejection. Thus, the heater performance scalar is employed to modify the base engine heat rejection response surface to encourage the hybrid powertrain system to select engine operating points that have higher heat rejection rates.

By observing the difference between the preferred minimum coolant temperature and the coolant temperature, control system behavior is modified only when the coolant temperature is less than the trajectory of the preferred minimum coolant temperature. The magnitude of the heater performance scalar is adjusted to minimize engine operation associated with achieving the preferred minimum coolant temperature. Such operation facilitates primary operation that optimizes fuel economy with minimum modification of engine operation to achieve warm-up of the coolant temperature.

The modified engine power loss response surface (220) and the hysteresis temperature band created around the preferred minimum coolant temperature trajectory (208) and the coolant temperature are employed to operate the hybrid powertrain system 20 in response to an operator torque request (222). Operating the hybrid powertrain system 20 includes determining preferred torque commands for the engine 40 (Te) and the non-combustion torque machines 35 and 36 (Tm) to generate an output torque transfer to the driveline 60 that is responsive to the operator torque request, wherein the engine 40 generates sufficient heat to cause the coolant temperature to follow the preferred minimum coolant temperature trajectory within the hysteresis temperature band. Such operation includes controlling occurrence of engine autostop events, engine autostart events and DFCO events.

Torque management control schemes are employed to determine preferred torque commands for the engine 40 (Te) and the non-combustion torque machines 35 and 36 (Tm) that are combined in the transmission 50 to generate an output torque transferable to the driveline 60 that is responsive to the operator torque request. The torque management control schemes balance operating cost and corresponding output torque for the engine and operating costs and corresponding output torques for the torque machines to determine preferred operating points for controlling operation of the engine and the torque machines in response to the operator torque request. The preferred operating points correspond to operating points that achieve an output torque that is responsive to the operator torque request and minimizes total operating costs. The modified operating costs, measured in units of power (kW) indicate higher operating costs at lower speed/load operating points and lower operating costs at high speed/load operating points. Engines operate with higher heat rejection rates at higher speed/load operating points. Thus, the modified engine power loss response surface encourages engine operation at higher speed/load points with corresponding higher heat rejection rates when the preferred minimum coolant temperature is greater than the coolant temperature.

As is appreciated, when a difference between the preferred minimum coolant temperature and the coolant temperature is minimized or erased, the modified engine power loss response surface 500 shown with reference to FIG. 5 resembles the base engine power loss response surface 400 shown with reference to FIG. 4, and the hybrid powertrain control system controls operation to minimize fuel consumption without need to consider achieving or maintaining the preferred coolant temperature.

The hysteresis temperature band created around the preferred minimum coolant temperature trajectory is employed in the hybrid control scheme to operate the hybrid powertrain system 20 to control occurrence of engine autostop events, engine autostart events and DFCO events, to limit engine autostop and autostart busyness and permit DFCO events.

Figure 7:
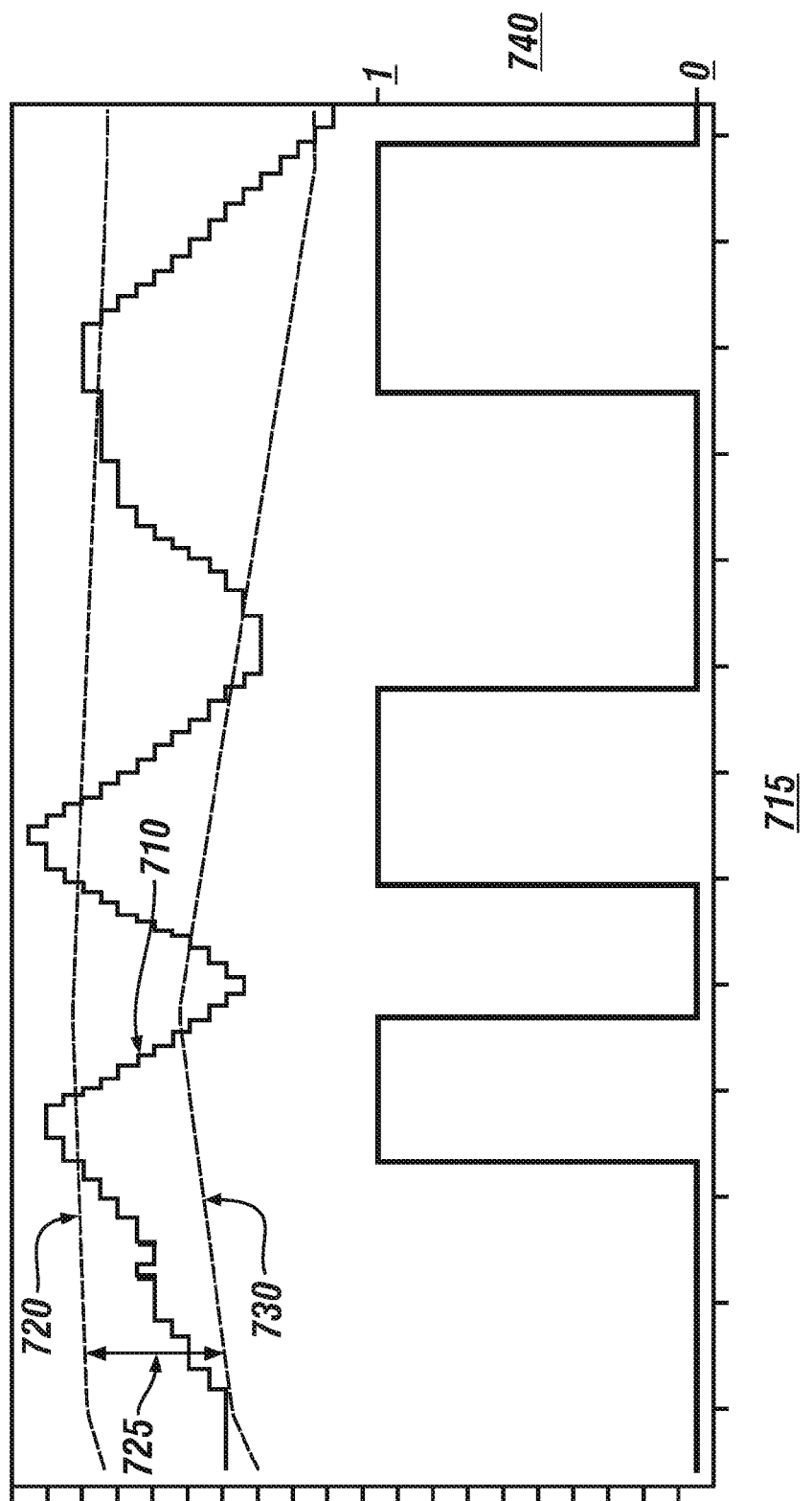
FIG. 7 illustrates coolant temperature and a hysteresis temperature band for the preferred minimum coolant temperature in relation to vehicle runtime determined for an internal combustion engine employed in a hybrid powertrain system in accordance with the disclosure.

FIG. 7 illustrates coolant temperature 710 and a hysteresis temperature band 725 for the preferred minimum coolant temperature in relation to vehicle runtime 715 determined for an internal combustion engine 40 employed in a hybrid powertrain system 20. The hysteresis temperature band 725 includes an upper preferred minimum coolant temperature 720 and a lower preferred minimum coolant temperature 730. An autostop enablement command 740 is shown. As indicated the autostop enablement command 740 is initially deactivated (0) and the internal combustion engine is operating after a cold start event, with the coolant temperature 710 increasing. The autostop enablement command 740 is activated (1) only after the coolant temperature 710 exceeds the upper preferred minimum coolant temperature 720, permitting engine autostop events and DFCO events. Engine autostop events and DFCO events are not permitted when the autostop enablement command 740 is deactivated (0).

The autostop enablement command 740 is subsequently deactivated (0) only after the coolant temperature 710 is less than the lower preferred minimum coolant temperature 730. The internal combustion engine is commanded to the ON state coincident with the deactivation (1) of the autostop enablement command 740. As indicated, the magnitude of the hysteresis temperature band 725 for the preferred minimum coolant temperature increases with the vehicle runtime 715 as the vehicle shifts from the warm-up period of operation to the stabilized period of operation.

Figure 8:
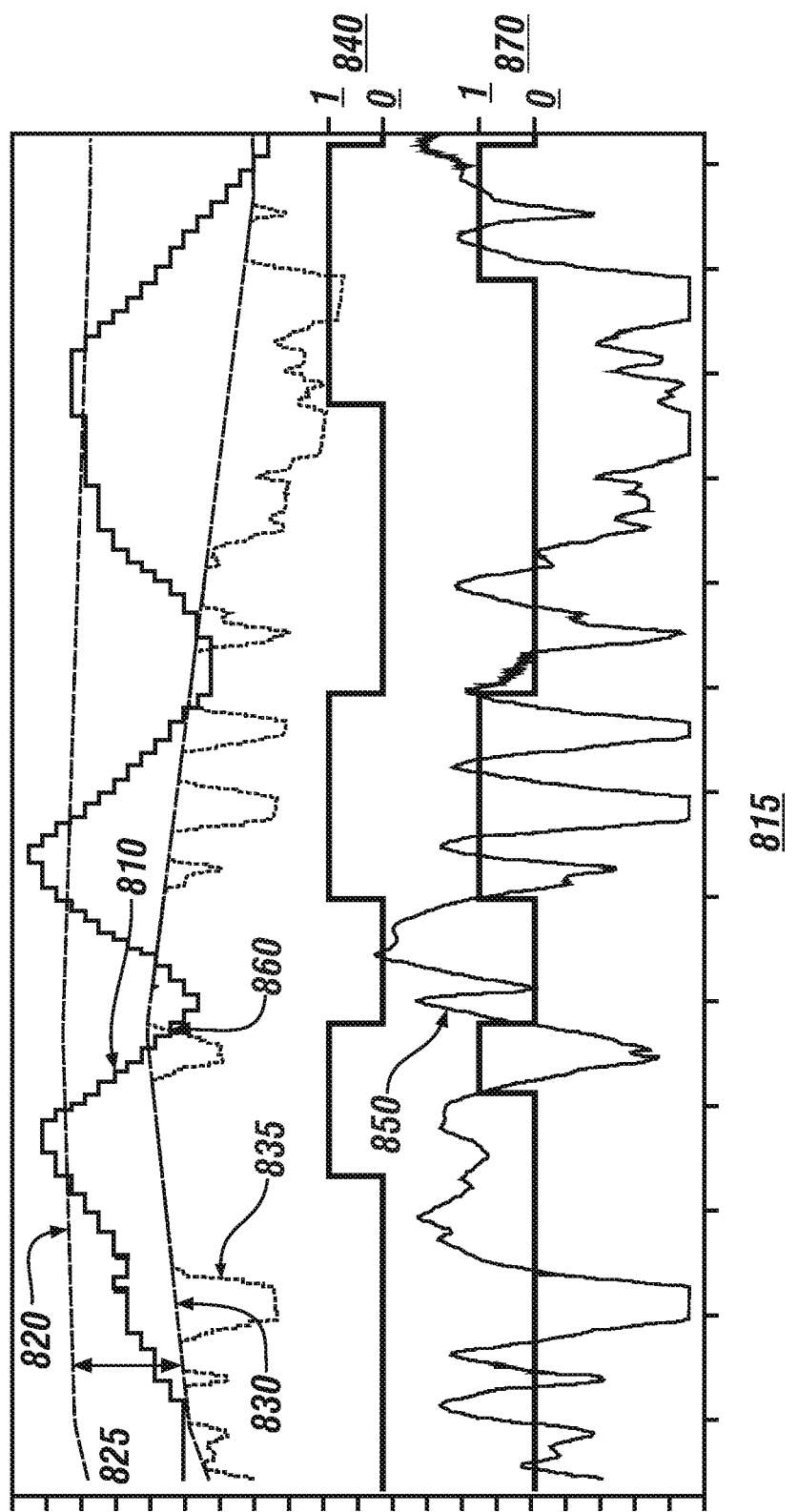
FIG. 8 illustrates coolant temperature and a modified hysteresis temperature band for the preferred minimum coolant temperature in relation to vehicle runtime determined for an internal combustion engine employed in a hybrid powertrain system in accordance with the disclosure.

The hysteresis temperature band may be modified in response to vehicle speed to reduce occurrence of engine autostart events at low vehicle speeds and under stopped/idle conditions. FIG. 8 illustrates coolant temperature 810 and a modified hysteresis temperature band 825 for the preferred minimum coolant temperature in relation to vehicle runtime 815 determined for an internal combustion engine 40 employed in a hybrid powertrain system 20. The modified hysteresis temperature band 825 includes an upper preferred minimum coolant temperature 820, a lower preferred minimum coolant temperature 830, and a modified lower preferred minimum coolant temperature 835. Vehicle speed 850 is shown. An autostop enablement command 840 and an autostop activation command 870 are shown. The modified lower preferred minimum coolant temperature 835 decreases in direct relation with the vehicle speed 850.

The autostop enablement command 840 is initially deactivated (0) and the autostop activation command 870 is deactivated (0) during engine warm-up. The autostop enablement command 840 is activated (1) when the coolant temperature 820 exceeds the upper preferred minimum coolant temperature 820, permitting autostop operation. The autostop activation command 870 is activated (1) in response to an operator torque request, indicated by a reduction in vehicle speed. The engine executes an autostop in response to enabling (1) the autostop activation command 870. The autostop enablement command 840 is subsequently deactivated (0) only after the coolant temperature 810 falls below the lower preferred minimum coolant temperature 830, or only after the coolant temperature 810 falls below the modified lower preferred minimum coolant temperature 835 when the vehicle speed is in a low speed range, e.g., less than 15 km/h or the vehicle is at rest. This is shown at 860. Under the low vehicle speed conditions, the autostop activation command 840 is deactivated unless the coolant temperature 810 drops below the modified lower preferred minimum coolant temperature 835, which may be 6° C. to 9° C. less than the lower preferred minimum coolant temperature 830.

Thus, the control system will not execute an autostart event with the vehicle speed in the low speed/idle range until the coolant temperature 810 is less than the modified lower preferred minimum coolant temperature 835, an example of which is indicated at 860.

The autostop activation command 870 is deactivated (0) only after the coolant temperature 810 is less than the modified lower preferred minimum coolant temperature 835. The internal combustion engine is commanded to operate coincident with the deactivation (0) of the autostop enablement command 840 and the deactivation (0) of the autostop activation command 870, albeit at the modified lower preferred minimum coolant temperature 835.

Operation of the hybrid powertrain system 20 and other vehicle and powertrain systems that affect engine operation, coolant temperature and electric load are controlled in response to operator commands and individual control schemes (224), and the coolant temperature is directly monitored preferably using the coolant temperature sensor (230). Exemplary vehicle and powertrain systems that affect engine operation, coolant temperature and electric load include the aforementioned controllable HVAC system, the EGHR configured to transfer heat between exhaust gas, engine coolant, and transmission fluid, the controllable electric-powered cabin heater, the controllable electric-powered windshield defogger, and the controllable electric-powered rear window defogger.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling a hybrid powertrain system including an internal combustion engine and a non-combustion torque machine, the method comprising controlling operation of the hybrid powertrain system including controlling the internal combustion engine to generate heat to cause the engine coolant temperature to follow a preferred minimum coolant temperature trajectory, wherein the preferred minimum coolant temperature trajectory comprises a vehicle runtime-based trajectory for a minimum coolant temperature during a warm-up period of engine operation and a stabilized period of operation that is selected from one of a plurality of predetermined trajectories in relation to outside air temperature and a vehicle soak time.

2. The method of claim 1, wherein controlling operation of the hybrid powertrain system comprises executing closed-loop control of the hybrid powertrain system to determine torque commands for the internal combustion engine and the non-combustion torque machine to generate an output torque from the hybrid powertrain system responsive to an operator torque request.

3. The method of claim 2, wherein executing closed-loop control of the hybrid powertrain system comprises:
    adjusting a base engine heat rejection response surface for the engine with a scalar multiplier determined in relation to a difference between the preferred minimum coolant temperature trajectory for the internal combustion engine and the coolant temperature; and
    controlling operation of the engine responsive to said adjusted base engine heat rejection response surface to generate heat to cause the coolant temperature to follow the preferred minimum coolant temperature trajectory.

4. The method of claim 3, wherein the preferred minimum coolant temperature trajectory is within a hysteresis temperature band.

5. The method of claim 4, wherein said hysteresis temperature band comprises an upper preferred minimum coolant temperature and a lower preferred minimum coolant temperature.

6. The method of claim 5, wherein the lower preferred minimum coolant temperature is modified in response to vehicle speed.

7. Method for controlling a hybrid powertrain system including an internal combustion engine, the method comprising:
    determining a preferred minimum coolant temperature trajectory for the internal combustion engine, wherein the preferred minimum coolant temperature trajectory comprises a vehicle runtime-based trajectory for a minimum coolant temperature during a warm-up period of engine operation and a stabilized period of operation that is selected from one of a plurality of predetermined trajectories in relation to outside air temperature and a vehicle soak time;
    executing closed-loop control of the hybrid powertrain system to generate torque commands for the internal combustion engine and a non-combustion torque machine to generate an output torque from the hybrid powertrain system responsive to an operator torque request and in response to the preferred minimum coolant temperature trajectory for the internal combustion engine and an engine coolant temperature; and
    controlling operation of the internal combustion engine to generate heat to cause the engine coolant temperature to follow the preferred minimum coolant temperature trajectory.

8. The method of claim 7, wherein the preferred minimum coolant temperature trajectory is within a hysteresis temperature band.

9. Method for controlling a hybrid powertrain system including an internal combustion engine, the method comprising:
    determining a preferred minimum coolant temperature trajectory for the internal combustion engine, the preferred minimum coolant temperature trajectory comprising a vehicle runtime-based trajectory for a minimum coolant temperature during a warm-up period of engine operation and a stabilized period of operation that is selected from one of a plurality of predetermined trajectories in relation to outside air temperature and a vehicle soak time;
    controlling the hybrid powertrain system including generating torque commands for the internal combustion engine and a non-combustion torque machine to generate an output torque from the hybrid powertrain system responsive to an operator torque request and in response to the preferred minimum coolant temperature trajectory and engine coolant temperature; and
    controlling operation of the internal combustion engine to generate heat to cause the engine coolant temperature to follow the preferred minimum coolant temperature trajectory.

10. The method of claim 9, wherein the preferred minimum coolant temperature trajectory is within a hysteresis temperature band.

11. The method of claim 10, wherein the hysteresis temperature band comprises an upper preferred minimum coolant temperature and a lower preferred minimum coolant temperature.

12. The method of claim 11, wherein the hysteresis temperature band comprises the upper preferred minimum coolant temperature and the lower preferred minimum coolant temperature, wherein the lower preferred minimum coolant temperature is modified in response to vehicle speed.

13. The method of claim 1, wherein controlling the internal combustion engine in response to a preferred minimum coolant temperature trajectory comprises deactivating engine autostop operation when the coolant temperature is less than the preferred minimum coolant temperature trajectory.

14. The method of claim 3, wherein controlling operation of the engine responsive to said adjusted base engine heat rejection response surface to generate heat to cause the coolant temperature to follow the preferred minimum coolant temperature trajectory comprises operating the engine at a higher speed/load point with a corresponding higher heat rejection rate when the preferred minimum coolant temperature is greater than the coolant temperature.

\* \* \* \* \*